US012572844B2

(12) United States Patent
Zheng et al.

(10) Patent No.: US 12,572,844 B2
(45) Date of Patent: Mar. 10, 2026

(54) PROBING MODEL SIGNAL AWARENESS

(71) Applicant: International Business Machines Corporation, Armonk, NY (US)

(72) Inventors: Yunhui Zheng, Chappaqua, NY (US); Sahil Suneja, Ossining, NY (US); Yufan Zhuang, New York, NY (US); Alessandro Morari, New York, NY (US); Jim Alain Laredo, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 17/315,701

(22) Filed: May 10, 2021

(65) Prior Publication Data

US 2022/0358400 A1     Nov. 10, 2022

(51) Int. Cl.
| | |
|---|---|
| *G06N 3/0464* | (2023.01) |
| *G06F 40/20* | (2020.01) |
| *G06N 3/08* | (2023.01) |
| *G06N 5/022* | (2023.01) |
| *G06N 5/04* | (2023.01) |
| *G06N 20/00* | (2019.01) |

(52) U.S. Cl.
CPC ............. *G06N 20/00* (2019.01); *G06F 40/20* (2020.01); *G06N 5/04* (2013.01)

(58) Field of Classification Search
CPC .......... G06N 20/00; G06N 5/04; G06F 40/20
See application file for complete search history.

(56) References Cited

U.S. PATENT DOCUMENTS

| | | | |
|---|---|---|---|
| 10,545,733 | B2 | 1/2020 | Sabharwal |
| 10,664,383 | B2 | 5/2020 | Saha |
| 10,706,329 | B2 | 7/2020 | Anushiravani |

(Continued)

FOREIGN PATENT DOCUMENTS

| | | |
|---|---|---|
| EP | 1291775 A1 | 3/2003 |
| WO | 03023615 | 3/2003 |

OTHER PUBLICATIONS

Zeller, Andreas, "Isolating Cause-Effect Chains from Computer Programs", Nov. 6, 2002, SIGSOFT Softw. Eng. Notes 27, 1-10. https://doi.org/10.1145/605466.605468 (Year: 2002).*

(Continued)

*Primary Examiner* — Kamran Afshar
*Assistant Examiner* — Steven Phung
(74) *Attorney, Agent, or Firm* — Shackelford, McKinley & Norton, LLP; Robert A. Voigt, Jr.

(57) ABSTRACT

A system, computer program product, and method are provided for probing model signal awareness. An iterative process is employed to systematically isolate one or more relevant tokens of an input sequence to generate a reduced input sequence. The reduced input sequence is validated and presented to a trained artificial intelligence (AI) model and prediction output is generated. The reduction process is continued while the prediction output stays the same as that of the input sequence, and until a minimal sub-sequence is identified. A signal existence in the minimal sub-sequence is verified and signal awareness of the trained AI model is evaluated. The evaluation includes measuring the verified signal existence against an original signal from the input sentence.

20 Claims, 10 Drawing Sheets

(56) References Cited

U.S. PATENT DOCUMENTS

| | | | |
|---|---|---|---|
| 10,782,946 B2 | 9/2020 | Makkar | |
| 10,824,635 B2 | 11/2020 | Marthala | |
| 10,834,026 B2 | 11/2020 | Nagaraja | |
| 2009/0030861 A1 | 1/2009 | Almond | |
| 2011/0093418 A1 | 4/2011 | Kwok | |
| 2017/0357848 A1* | 12/2017 | Su | G06F 3/017 |
| 2018/0005112 A1 | 1/2018 | Iso-Sipila | |
| 2018/0150547 A1* | 5/2018 | Pallath | G06N 20/20 |
| 2019/0370697 A1 | 12/2019 | Ramachandra Iyer | |
| 2020/0183748 A1* | 6/2020 | Bhatnagar | G06F 9/50 |
| 2020/0210817 A1 | 7/2020 | Chatterjee | |
| 2020/0311273 A1 | 10/2020 | Knox | |
| 2020/0320163 A1* | 10/2020 | Raiskin | G06F 40/14 |
| 2020/0401702 A1* | 12/2020 | Karabatis | G06F 8/75 |
| 2022/0243943 A1* | 8/2022 | Taghvaeeyan | F24F 11/58 |

OTHER PUBLICATIONS

Allamanis, M., et al., "A Convolutional Attention Network for Extreme Summarization of Source Code", arXiv:1602.03001v2, May 25, 2016.

Allamanis, M., et al., "Learning to Represent Programs with Graphs", ICLR 2018 Conference, arXiv: 1711.00740v3, May 4, 2018.

Allamanis, M., et al., "Suggesting Accurate Method and Class Names", Proceedings of the 2015 10th Joint Meeting pn Foundations of Software Engineering, pp. 38-49, Aug. 2015.

Allamanis, Miltiadis, "The Adverse Effects of Code Duplication in Machine Learning Models of Code", arXiv1812.06469v6, Aug. 11, 2019.

Bavishi, R., et al., "Context2Name: A Deep Learning-Based Approach to Infer Natural Variable Names from Usage Contexts", arXiv: 1809.05193v1, Aug. 31, 2018.

Carlini, N., et al., "Towards Evaluating the Robustness of Neural Networks", arXiv:1608.04644v2, Mar. 22, 2017.

Chakraborty, S., et al., "Deep Learning based Vulnerability Detection: Are We There Yet?", IEEE Transactions on Software Engineering, arXiv: 2009.07235v1, Sep. 3, 2020.

Chung, J., et al., "Empirical Evaluation of Gated Recurrent Neural Networks on Sequence Modeling", arXiv: 1412.3555v1, Dec. 11, 2014.

Das, A., et al., "Opportunities and Challenges in Explainable Artificial Intelligence (XAI): A Survey", arXiv: 2006.11371v2, Jun. 23, 2020.

Engstrom, L., et al., "Exploring the Landscape of Spatial Robustness", arXiv: 1712.02779 v4, Sep. 16, 2019.

Gilmer, J., et al., "Neural Message Passing for Quantum Chemistry", arXiv: 1704.01212v2, Jun. 12, 2017.

Goodfellow, I., et al., "Explaining and Harnessing Adversarial Examples", arXiv: 1412.6572v3, Mar. 20, 2015.

Guo, W., et al., "LEMNA: Explaining Deep Learning based Security Applications", CCS '18: Proceedings of the 2018 ACM SIGSAC Conference on Computer and Communications Security, pp. 364-379, Oct. 2018.

Gupta, N., "Locating Faulty Code Using Failure-Inducing Chops", ASE '05: Proceedings of the 20th IEEE/ACM International Conference on Automated Software Engineering, pp. 263-272, Nov. 2005.

Hase, P., et al., "Evaluating Explainable AI : Which Algorithmic Explanations Help Users Predict Model Behaviors", arXiv:2005. 01831v1, May 4, 2020.

Hassanshahi, B., et al., "Web-to-Application Injection Attacks on Android: Characterization and Detection", European Symposium on Research in Computer Security, pp. 577-598, Sep. 2015.

He, K., et al., "Deep Residual Learning for Image Recognition", arXiv: 1512.03385v1, Dec. 10, 2015.

Hochreiter, S., et al., "Long Short-Term Memory", Neural Computation 9, pp. 1735-1780, 1997.

Iyer, S., et al., "Summarizing Source Code using a Neural Attention Model", Proceedings of the 54th Annual Meeting of the Association for Computational Linguistics, pp. 2073-2083, Aug. 2016.

Jimenez, M., et al., "The Importance of Accounting for Real-World Labelling When Predicting Software Vulnerabilities", Proceedings of the 27th ACM Joint European Software Engineering Conference and Symposium on the Foundations of Software Engineering (ESEC/FSE '19), pp. 695-705, Aug. 2019.

Kailkhura, B., et al., "Reliable and Explainable Machine Learning Methods for Accelerated Material Discovery", arXiv: 1901. 02717v2, Mar. 2019.

Kingma, D., et al., "ADAM: A Method for Stochastic Optimization", arXiv: 1412.6980v9, Jan. 30, 2017.

Kipf, T.,et al., "Semi-Supervised Classificaiton with Graph Convolutional Networks", arXiv: 1609.02907v4, Feb. 22, 2017.

Kiss, A., et al., "HDDr: A Recursive Variant Of The Hierarchical Delta Debugging Algorithm", A-TEST '18, pp. 16-22, Nov. 5, 2018.

Koc, U., et al., "Learning a Classifier for False Positive Error Reports Emitted by Static Code Analysis Tools" MAPL 2017: Proceedings of the 1st ACM SIGPLAN International Workshop on Machine Learning and Programming Languages, pp. 35-42, Jun. 2017.

Krizhevsky, A., et al., "ImageNet Classification with Deep Convolutional Neural Networks", Communications of the ACM, May 2017.

Kurakin, A., et al., "Adversarial Examples in the Physical World", arXiv: 1607.02533v4, Feb. 11, 2017.

Leclair, "Improved Code Summarization via a Graph Neural Network", arXiv:2004.02843v2, Apr. 7, 2020.

Li, O., et al., "Deep Learning for Case-Based Reasoning through Prototypes: A Neural Network that Explains Its Predictions", arXiv: 1710.04806v2, Nov. 21, 2017.

Li, Y., et al., "Gated Graph Sequence Neural Networks", arXiv: 1511.05493v4, Sep. 22, 2017.

Li, Z., et al., "SySeVR: A Framework for Using Deep Learning to Detect Software Vulnerabilities" arXiv: 1807.06756v3, Jan. 12, 2021.

Li, Z., et al., "VulDeePecker: A Deep Learning-Based System for Vulnerability Detection", Network and Distributed System Security (NDSS) Symposium 2018, arXiv: 1801.01681v1, Jan. 5, 2018.

Liu, P., e al., "Recurrent Neural Network for Text Classification with Multi-Task Learning", arXiv: 1605.05101v1, May 17, 2016.

Lundberg, S., et al., "A Unified Approach to Interpreting Model Predictions", 31st Conference on Neural Information Processing Systems (NIPS 2017), arXiv: 1705.07874v2, Nov. 25, 2017.

Madry, A., et al., "Towards Deep Learning Models Resistant to Adversarial Attacks", arXiv: 1706.06083v4, Sep. 4, 2019.

Misherghi, G., et al., "HDD: Hierarchical Delta Debugging", ICSE 06, Proceedings of the 28th International Conference on Software Engineering, pp. 142-151, May 20-28, 2006.

Moosavi-Dezfooli, S-M, et al., "DeepFool: a simple and accurate method to fool deep neural networks", arXiv: 1511.04599v3, Jul. 4, 2016.

Ren, S., et al., "Faster R-CNN: Towards Real-Time Object Detection with Region Proposal Networks", arXiv: 1506.01497v3, Jan. 6, 2016.

Ribeiro, M., et al., "Why Should I Trust You? Explaining the Predictions of Any Classifier", KDD '16: Proceedings of the 22nd ACM SIGKDD International Conference on Knowledge Discovery and Data Mining, pp. 1135-1144, Aug. 2016.

Roscher, R., et al., Explainable Machine Learning For Scientific Insights And Discoveries:, IEEE Access, vol. 8, pp. 42200-42216, Feb. 24, 2020.

Russell, R., et al., "Automated Vulnerability Detection in Source Code Using Deep Representation Learning", 17th IEEE International Conference on Machine Learning and Applications, 2018. arXiv: 1807.04320v2, Nov. 28, 2018.

Sak, H., et al., "Long Short-Term Memory Recurrent Neural Network Architectures for Large Scale Acoustic Modeling", INTERSPEECH 2014, 15th Annual Conference of the International Speech Communication Association, pp. 338-342, Sep. 2014.

(56) References Cited

OTHER PUBLICATIONS

Selvaraju, R., et al., "Grad-CAM: Visual Explanations from Deep Networks via Gradient-based Localization", arXiv:1610.02391v4, Dec. 3, 2019.

Bestili, C., et al., "Towards security defect prediction with AI", arXiv: 1808.09897v2, Sep. 12, 2018.

Shar, L., et al., "Predicting common web application vulnerabilities from input validation and sanitization code patterns", ASE '12, pp. 310-313, Sep. 2012.

Sharif, M., et al., "Accessorize to a Crime: Real and Stealthy Attacks on State-of-the-Art Face Recognition", CCS ' 16: Proceedings of the 2016 ACM SIGSAC Conference on Computer and Communications Security, pp. 1528-1540, Oct. 2016.

Shrikumar, A., et al., "Learning Important Features Through Propagating Activation Differences", arXiv: 1704.02685v2, Oct. 12, 2019.

Simonyan, K., et al., "Very Deep Convolutional Networks For Large-Scale Image Recognition", ICLR 2015, arXiv: 1409.1556v6, Apr. 10, 2015.

Spinner, T., et al., "explAIner: A Visual Analytics Framework For Interactive And Explainable Machine Learning", arXiv:1908.00087v2, Oct. 7, 2019.

Sundararajan, M., et al., "Axiomatic Attribution for Deep Networks", arXiv: 1703.01365v2, Jun. 13, 2017.

Grace Period Disclosure, Suneja et al., "Probing Model Signal-Awareness via Prediction-Preserving Input Minimization", ESEC/FSE 2021: Proceedings of the 29th ACM Joint Meeting on European Software Engineering Conference and Symposium on the Foundations of Software Engineering, Nov. 25, 2020, 11 pages.

* cited by examiner

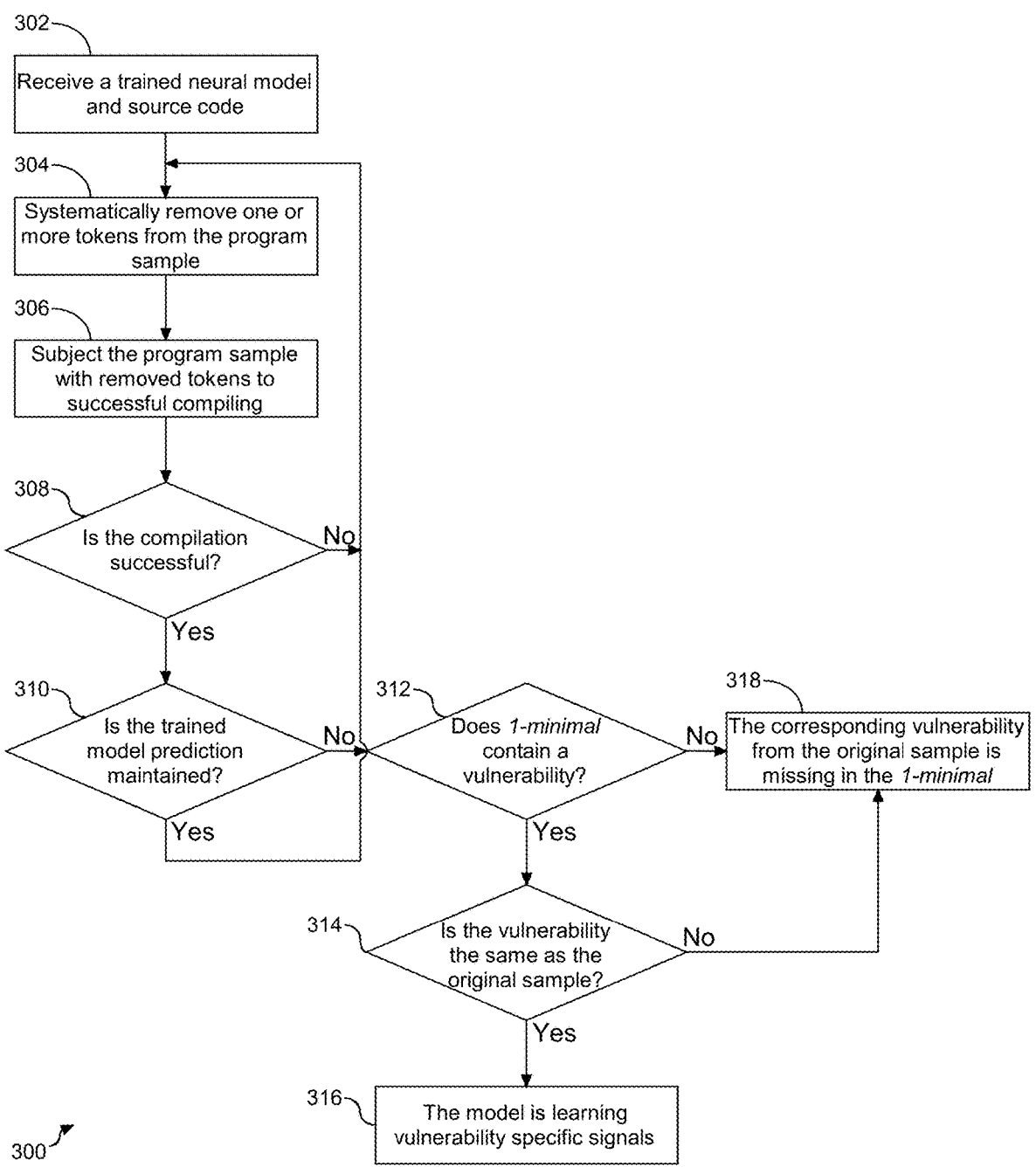

302

Receive a trained neural model and source code

304

Systematically remove one or more tokens from the program sample

306

Subject the program sample with removed tokens to successful compiling

308

Is the compilation successful?          No

Yes

310

Is the trained model prediction maintained?          No

Yes

312

Does *1-minimal* contain a vulnerability?          No

Yes

318

The corresponding vulnerability from the original sample is missing in the *1-minimal*

314

Is the vulnerability the same as the original sample?          No

Yes

316

The model is learning vulnerability specific signals

Figure 4A:
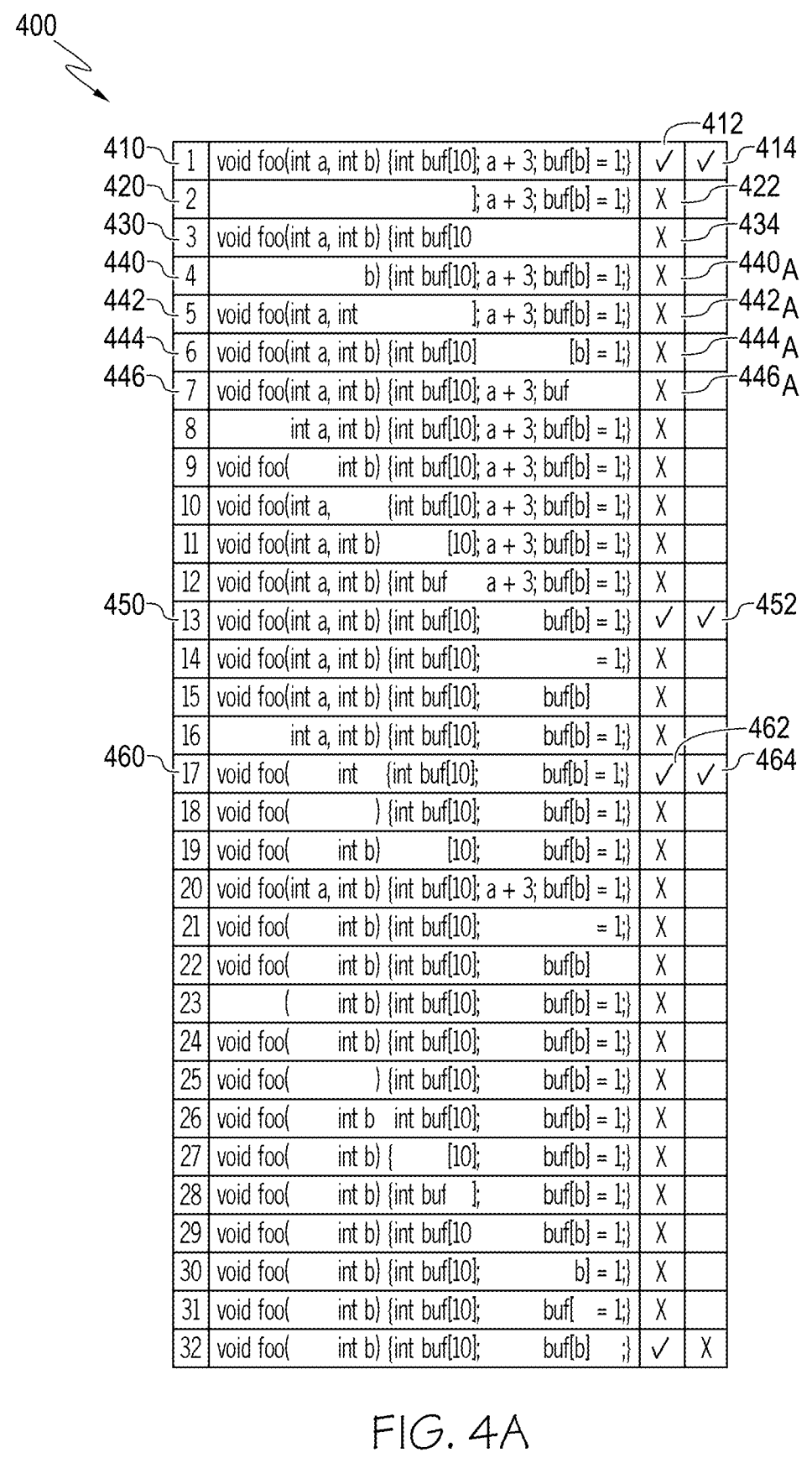

| # | Code | | |
|---|------|---|---|
| 1 | void foo(int a, int b) {int buf[10]; a + 3; buf[b] = 1;} | ✓ | ✓ |
| 2 | ]; a + 3; buf[b] = 1;} | X | |
| 3 | void foo(int a, int b) {int buf[10 | X | |
| 4 | b) {int buf[10]; a + 3; buf[b] = 1;} | X | |
| 5 | void foo(int a, int ]; a + 3; buf[b] = 1;} | X | |
| 6 | void foo(int a, int b) {int buf[10] [b] = 1;} | X | |
| 7 | void foo(int a, int b) {int buf[10]; a + 3; buf | X | |
| 8 | int a, int b) {int buf[10]; a + 3; buf[b] = 1;} | X | |
| 9 | void foo( int b) {int buf[10]; a + 3; buf[b] = 1;} | X | |
| 10 | void foo(int a, {int buf[10]; a + 3; buf[b] = 1;} | X | |
| 11 | void foo(int a, int b) [10]; a + 3; buf[b] = 1;} | X | |
| 12 | void foo(int a, int b) {int buf a + 3; buf[b] = 1;} | X | |
| 13 | void foo(int a, int b) {int buf[10]; buf[b] = 1;} | ✓ | ✓ |
| 14 | void foo(int a, int b) {int buf[10]; = 1;} | X | |
| 15 | void foo(int a, int b) {int buf[10]; buf[b] | X | |
| 16 | int a, int b) {int buf[10]; buf[b] = 1;} | X | |
| 17 | void foo( int {int buf[10]; buf[b] = 1;} | ✓ | ✓ |
| 18 | void foo( ) {int buf[10]; buf[b] = 1;} | X | |
| 19 | void foo( int b} [10]; buf[b] = 1;} | X | |
| 20 | void foo(int a, int b) {int buf[10]; a + 3; buf[b] = 1;} | X | |
| 21 | void foo( int b) {int buf[10]; = 1;} | X | |
| 22 | void foo( int b) {int buf[10]; buf[b] | X | |
| 23 | ( int b) {int buf[10]; buf[b] = 1;} | X | |
| 24 | void foo( int b) {int buf[10]; buf[b] = 1;} | X | |
| 25 | void foo( ) {int buf[10]; buf[b] = 1;} | X | |
| 26 | void foo( int b int buf[10]; buf[b] = 1;} | X | |
| 27 | void foo( int b) { [10]; buf[b] = 1;} | X | |
| 28 | void foo( int b) {int buf } buf[b] = 1;} | X | |
| 29 | void foo( int b) {int buf[10 buf[b] = 1;} | X | |
| 30 | void foo( int b) {int buf[10]; b] = 1;} | X | |
| 31 | void foo( int b) {int buf[10]; buf[ = 1;} | X | |
| 32 | void foo( int b) {int buf[10]; buf[b] ;} | ✓ | X |

| 33 | void foo( | int b) {int buf[10]; | buf[b] = 1 | X | |
|----|-----------|----------------------|------------|---|---|
| 34 | foo( | int b) {int buf[10]; | buf[b] = 1;} | ✓ | ✓ |
| 35 | ( | int b) {int buf[10]; | buf[b] = 1;} | X | |
| 36 | foo | int b) {int buf[10]; | buf[b] = 1;} | X | |
| 37 | foo( | ) {int buf[10]; | buf[b] = 1;} | X | |
| 38 | foo( | int b  int buf[10]; | buf[b] = 1;} | X | |
| 39 | foo( | int b) {   [10]; | buf[b] = 1;} | X | |
| 40 | foo( | int b) {int buf   ]; | buf[b] = 1;} | X | |
| 41 | foo( | int b) {int buf[10 | buf[b] = 1;} | X | |
| 42 | foo( | int b) {int buf[10]; | b] = 1;} | X | |
| 43 | foo( | int b) {int buf[10]; | buf[  = 1;} | X | |
| 44 | foo( | int b) {int buf[10]; | buf[b]   ;} | ✓ | X |
| 45 | foo( | int b) {int buf[10]; | buf[b] = 1 | X | |
| 46 | foo( | b) {int buf[10]; | buf[b] = 1;} | ✓ | ✓ |
| 47 | foo( | b) {int buf[10]; | buf[b] = 1;} | X | |
| 48 | foo( | b)  int buf[10]; | buf[b] = 1;} | X | |
| 49 | foo( | b) {   buf[10]; | buf[b] = 1;} | X | |
| 50 | foo( | b) {int   [10]; | buf[b] = 1;} | X | |
| 51 | foo( | b) {int buf 10]; | buf[b] = 1;} | X | |
| 52 | foo( | b) {int buf[  ]; | buf[b] = 1;} | X | |
| 53 | foo( | b) {int buf[10 ; | buf[b] = 1;} | X | |
| 54 | foo( | b) {int buf[10] | buf[b] = 1;} | X | |
| 55 | foo( | b) {int buf[10]; | [b] = 1;} | X | |
| 56 | foo( | b) {int buf[10]; | buf b] = 1;} | X | |
| 57 | foo( | b) {int buf[10]; | buf[ ] = 1;} | X | |
| 58 | foo( | b) {int buf[10]; | buf[b  = 1;} | X | |
| 59 | foo( | b) {int buf[10]; | buf[b]   1;} | X | |
| 60 | foo( | b) {int buf[10]; | buf[b] =  ;} | X | |
| 61 | foo( | b) {int buf[10]; | buf[b] = 1 } | X | |
| 62 | foo( | b) {int buf[10]; | buf[b] = 1; | X | |
| 63 | ( | b) {int buf[10]; | buf[b] = 1;} | X | |
| 64 | foo | b) {int buf[10]; | buf[b] = 1;} | X | |

470
472
474
480
482
484

Result
foo(b) {int buf[10]; buf[b] = 1;}

FIG. 4B

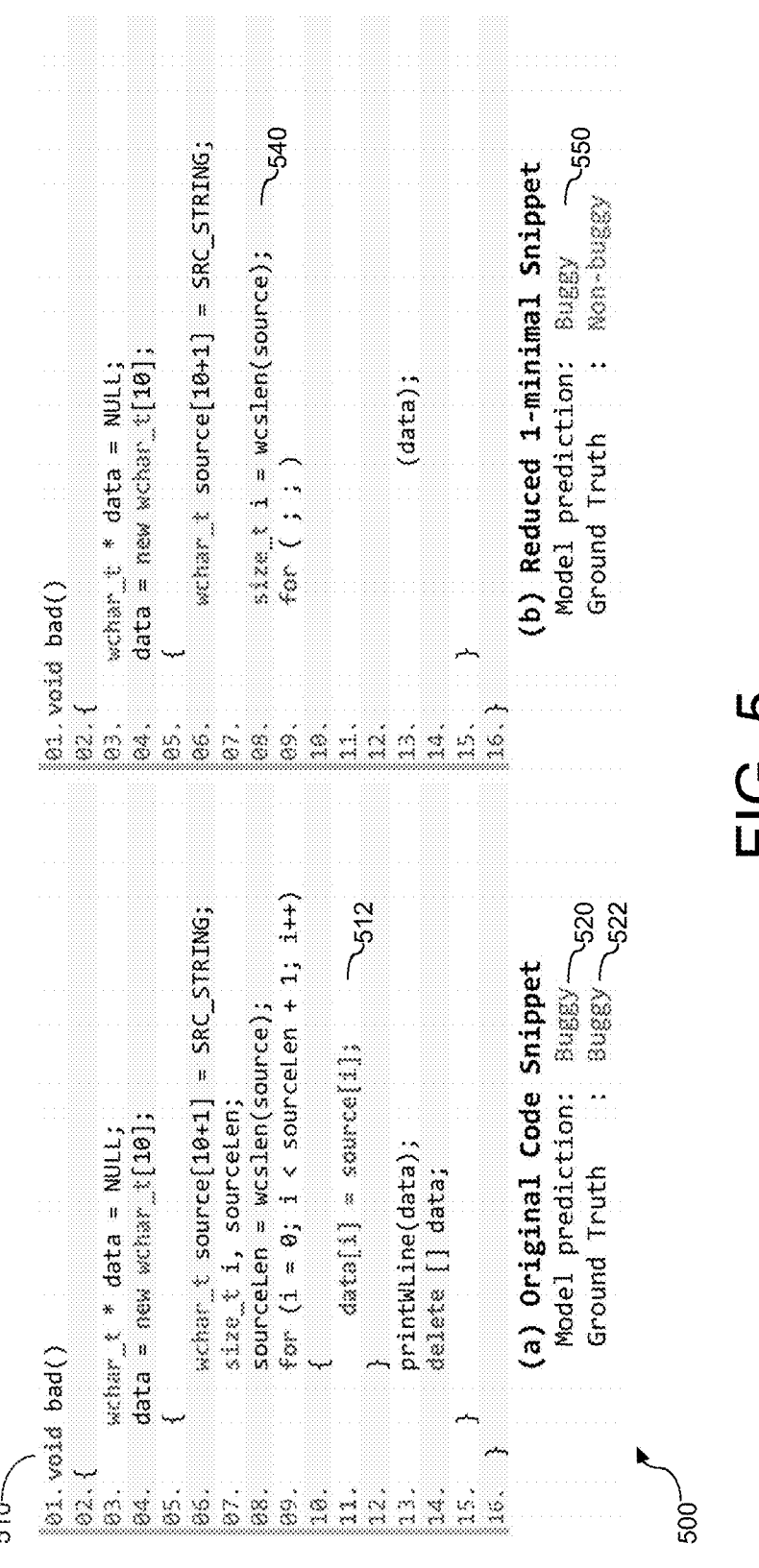

```
01. void bad()
02. {
03.    wchar_t * data = NULL;
04.    data = new wchar_t[10];
05.    {
06.        wchar_t source[10+1] = SRC_STRING;
07.        size_t i, sourceLen;
08.        sourceLen = wcslen(source);
09.        for (i = 0; i < sourceLen + 1; i++)
10.        {
11.            data[i] = source[i];                    ~512
12.        }
13.        printWLine(data);
14.        delete [] data;
15.    }
16. }
```
510

(a) Original Code Snippet
    Model prediction:  Buggy  ~520
    Ground Truth    :  Buggy  ~522

```
01. void bad()
02. {
03.    wchar_t * data = NULL;
04.    data = new wchar_t[10];
05.    {
06.        wchar_t source[10+1] = SRC_STRING;
07.
08.        size_t i = wcslen(source);            ~540
09.        for ( ; ; )
10.
11.
12.
13.            (data);
14.
15.    }
16. }
```

(b) Reduced 1-minimal Snippet
    Model prediction:  Buggy      ~550
    Ground Truth    :  Non-buggy

602 — Classify all vulnerable samples in a test set into TP or FN

604 — Subject each predicted TP to source code minimization

606 — Query the trained model for its prediction on each TP sample's *1-minimal*

608 — Review *1-minimal* for the presence or absence of the vulnerability of the original source code 610 — Measure SAR by the model for the test dataset

600

PROBING MODEL SIGNAL AWARENESS

BACKGROUND

The present embodiment(s) relate to a computer system, computer program product, and a computer-implemented method for evaluating capacity of a trained machine learning model to capture task-relevant signals. More specifically, the embodiments are directed to a signal aware recall measurement of the model.

Artificial Intelligence (AI) relates to the field of computer science directed at computers and computer behavior as related to humans. AI refers to the intelligence when machines, based on information, are able to make decisions, which maximize the chance of success in a given topic. More specifically, AI is able to learn from a data set to solve problems and provide relevant recommendations. For example, in the field of artificial intelligent computer systems, natural language (NL) systems (such as the IBM Watson® artificially intelligent computer system or other natural language interrogatory answering systems) process NL based on system acquired knowledge.

In the field of AI computer systems, natural language processing (NLP) systems process natural language based on acquired knowledge. NLP is a field of AI that functions as a translation platform between computer and human languages. More specifically, NLP enables computers to analyze and understand human language. Natural Language Understanding (NLU) is a category of NLP that is directed at parsing and translating input according to natural language principles. Examples of such NLP systems are the IBM Watson® artificial intelligent computer system and other natural language question answering systems.

Machine learning (ML), which is a subset of AI, utilizes algorithms to learn from data and create foresights based on the data. ML is the application of AI through creation of models, for example, artificial neural networks that can demonstrate learning behavior by performing tasks that are not explicitly programmed. There are different types of ML including learning problems, such as supervised, unsupervised, and reinforcement learning, hybrid learning problems, such as semi-supervised, self-supervised, and multi-instance learning, statistical inference, such as inductive, deductive, and transductive learning, and learning techniques, such as multi-task, active, online, transfer, and ensemble learning.

In machine learning, prediction refers to an output signal from a machine learning model after it has been trained on a dataset and applied to new data when forecasting a likelihood of a particular outcome. Measurements, such as F1, are directed at prediction performance, where F1 is a measure of a model's accuracy on a dataset. However, such measurements do not address whether the machine learning model(s) is picking up the right signals to arrive at their prediction. Accordingly, as shown and described herein a new measurement is provided to address the shortcomings of known measurement techniques with respect to signal evaluation.

SUMMARY

The embodiments disclosed herein include a computer system, computer program product, and computer-implemented method for evaluating signal awareness of a trained machine learning model by minimizing input sequences to the model while maintaining the predictions of the model. Those embodiments are further described below in the Detailed Description. This Summary is neither intended to identify key features or essential features or concepts of the claimed subject matter nor to be used in any way that would limit the scope of the claimed subject matter.

In one aspect, a computer system is provided with a processor operatively coupled to memory, and an artificial intelligence (AI) platform operatively coupled to the processor. The AI platform is configured with a token manager, a validator, an evaluator, and a signal manager configured with functionality to support probing model signal awareness. The token manager is configured to identify a minimal sub-sequence from an input sequence while a prediction from the input sentence by a trained AI model is preserved. The validator, which is operatively coupled to the token manager, functions to present a validated reduced input sequence to the AI model to generate a prediction. The evaluator, which is operatively coupled to the profile manager functions to compare the generated prediction of the reduced sequence with prediction output from the input sequence. The signal manager, which is operatively coupled to the evaluator, functions to leverage the prediction of the identified minimal sub-sequence and create a signal awareness measurement, with the measurement representing an ability of the AI model to capture a task-relevant signal.

In another aspect, a computer program product is provided with a computer readable storage medium having embodied program code. The program code is executable by the processing unit with functionality to probe model signal awareness. More specifically, the program code identifies a minimal sub-sequence from an input sequence that preserves a prediction of a trained AI model on the input sequence. Program code is provided to present a validated reduced input sequence to the AI model to generate a prediction from the model for the reduced input sequence. Thereafter, the program code compares the prediction of the reduced sequence with prediction output from the input sequence, and continues the iterative reduction process, resulting in identification of the minimal sub-sequence. Following the identification, program code leverages the prediction of the identified minimal sub-sequence and creates a signal awareness measurement, with the measurement representing an ability of the AI model to capture a task-relevant signal.

In yet another aspect, a method is provided for probing model signal awareness. An iterative process is employed to systematically identify a minimal sub-sequence from an input sequence while preserving the prediction of the input sequence by a trained artificial intelligence (AI) model. A validated reduced input sequence is presented to the trained AI model to generate a prediction for the reduced input sequence. The prediction of the reduced sequence is matched with prediction output from the input sequence, and the iterative reduction process is continued until a minimal sub-sequence is identified. Following the identification of the minimal sub-sequence, the prediction of the identified minimal sub-sequence is leveraged and a signal awareness measurement is created, with the measurement representing an ability of the AI model to capture a task-relevant signal.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

FIG. 3 depicts a flow chart to illustrate a process for prediction-preserving sequence minimization from a vulnerability detection perspective.

FIGS. 4A-4B depict a diagram to illustrate an example of source code minimization to produce a valid 1-minimal and determine if the trained model learns vulnerability related signals.

FIG. 5 depicts a block diagram to illustrate an example of source code minimization demonstrating the trained AI model incorrectly learning a non-vulnerability signal.

DETAILED DESCRIPTION

Figure 1:
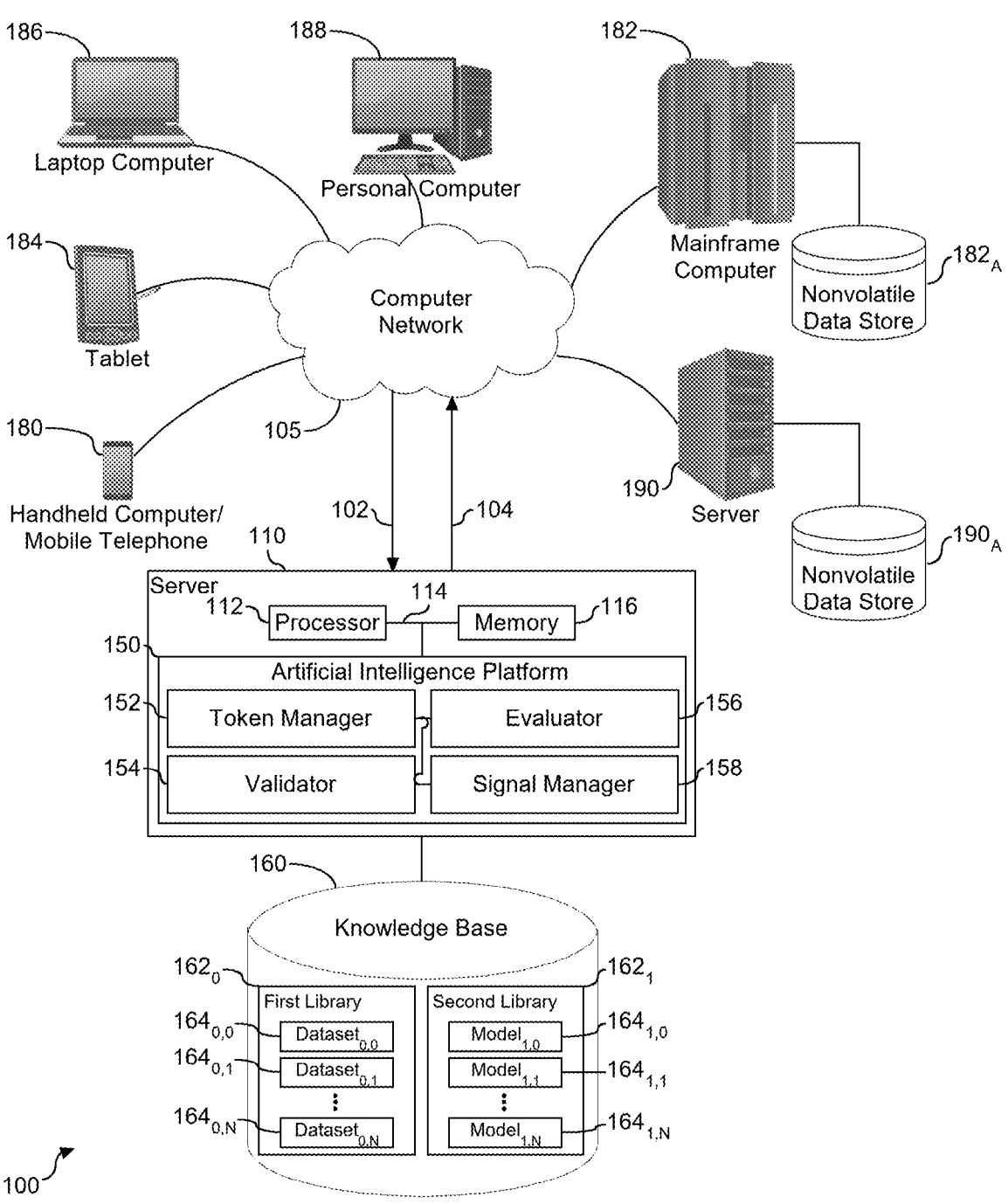
FIG. 1 depicts a block diagram illustrating a computer system with tools to support signal awareness recall (SAR) metric to evaluate an ability of a trained AI learning models to capture task-relevant signals.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial neural networks (ANNs) are models of the way the nervous system operates. Basic units are referred to as neurons, which are typically organized into layers. The ANN works by simulating a large number of interconnected processing units that resemble abstract versions of neurons. There are typically three parts in an ANN, including an input layer, with units representing input fields, one or more hidden layers, and an output layer, with a unit or units representing target field(s). The units are connected with varying connection strengths or weights. Input data is presented to the first layer, and values are propagated from each neuron to neurons in the next layer. At a basic level, each layer of the neural network includes one or more operators or functions operatively coupled to output and input. The outputs of evaluating the activation functions of each neuron with provided inputs are referred to herein as activations. Complex neural networks are designed to emulate how the human brain works, so computers can be trained to support poorly defined abstractions and problems where training data is available.

ANNs are often used in image recognition, speech, and computer vision applications. As an example, an ANN trained for Natural Language Processing (NLP) may receive input in the form of natural language and generate output in the form of sentiment analysis. Similarly, an ANN may be trained to receive input in the form of source code to generate output in the form of vulnerability detection. In an exemplary embodiment, other neural networks and machine learning models exist which accept sequential inputs to perform different learning tasks. These are all candidate models and tasks, although the present embodiment focuses vulnerability detection over source code inputs. Accordingly, the system, computer program product, and method shown and described herein is not dependent on any internal workings of a corresponding model, and as such is not restricted to ANNs, and may be applied to any machine learning or AI model.

Programming defects are an inevitable reality in software creation. Vulnerabilities, also referred to herein as bugs, arise when such defects fall in a security related subset, such as null pointer dereference, buffer overflow, use-after-free, etc. Static analyzers detect such vulnerabilities either by reasoning about possible execution behaviors over a program model, or by matching defect-specific rules. Dynamic analysis directly executes the program, exploring different execution paths to concretely expose the defects. Unlike traditional analyzers, logic for AI for code models is implicit, and not directly perceptible. Accordingly, as shown and described below, the models are explored with respect to detecting if the models are learning a task-relevant vulnerability signal(s).

Signal awareness is different than correctness. Signal awareness is directed at verifying if an AI model trained on a dataset is learning correct logic relevant to code analysis. As shown and described herein, a systematic approach is provided to uncover the trained AI model's vulnerability detection logic and evaluate its ability to capture task-specific signals. Trained machine learning models, hereinafter referred to as trained models, are evaluated on a test dataset, while querying the trained model with iteratively reduced versions, to uncover precisely what portion of the original source code the trained model considers to be relevant for its prediction. By counting occurrences across the test dataset where a minimal portion contains the same vulnerability as the original source code, a signal aware measurement of the trained model is obtained.

As shown and described herein, a subset of input source code satisfying a set of requirements is derived and identified. The requirements include the following: the subset source code leads to the same output, and not a single element can be removed from the subset to preserve the original prediction output. The derived and identified subset is referred to herein as a 1-minimal. The aspect of deriving the 1-minimal is directed at isolating relevant tokens of an input sequence to the trained model. After the 1-minimal is derived, it is subject to signal awareness evaluation to assess if it returns the same task-profile as the original input, e.g.

prior to identification of the 1-minimal. This assessment is referred to as a signal awareness recall measure, as described in detail below, and serves as an indicator to determine and quantify model learning. Accordingly, the 1-minimal preserves a prediction, e.g. the output, of the trained model.

Referring to FIG. 1, a block diagram (100) is provided to illustrate a computer system with tools to support a signal awareness recall (SAR) metric to evaluate an ability of the trained model to capture task-relevant signals. The SAR metric is directed at evaluation of the trained model, and more specifically ability of the trained model to capture a correct task-relevant signal to produce appropriate output. The system and associated tools, as described herein, leverage datasets with ground truth (GT) vulnerability information, e.g. bug locations, to evaluate the trained model(s). As shown, a server (110) is provided in communication with a plurality of computing devices (180), (182), (184), (186), (188), and (190) across a network connection (105). The server (110) is configured with a processing unit (112) operatively coupled to memory (114) across a bus (116). A tool in the form of an artificial intelligence (AI) platform (150) is shown local to the server (110), and operatively coupled to the processing unit (112) and memory (114). As shown, the AI platform (150) contains tools in the form of a token manager (152), a validator (154), an evaluator (156), and a signal manager (158). Together, the tools provide functional support for SAR, over the network (105) from one or more computing devices (180), (182), (184), (186), (188), and (190). The computing devices (180), (182), (184), (186), (188), and (190) communicate with each other and with other devices or components via one or more wires and/or wireless data communication links, where each communication link may comprise one or more of wires, routers, switches, transmitters, receivers, or the like. In this networked arrangement, the server (110) and the network connection (105) enable performance evaluation of the trained model(s) in the form of signal awareness. Other embodiments of the server (110) may be used with components, systems, sub-systems, and/or devices other than those that are depicted herein.

The tools, including the AI platform (150), or in one embodiment, the tools embedded therein including the token manager (152), the validator (154), the evaluator (156), and the signal manager (158) may be configured to receive input from various sources, including but not limited to input from the network (105), and an operatively coupled knowledge base (160). As shown herein, the knowledge base (160) includes a first library ($162_0$) of datasets, also referred to herein as test sets, shown herein as $dataset_{0,0}$ ($164_{0,0}$), $dataset_{0,1}$ ($164_{0,1}$), . . . , $dataset_{0,N}$ ($164_{0,N}$). Each test set, also referred to herein as a test dataset, contains one or more source code vulnerabilities and location of the vulnerabilities, which in an embodiment includes granularity of line-level vulnerability information. Examples of datasets include, but are not limited to, Juliet, s-bAbI, and Github®. The Juliet dataset contains synthetic examples with different vulnerability types. The s-bAbI dataset is a synthetic dataset containing syntactically valid programs with non-trivial control flow, which in an embodiment is directed on buffer overflow vulnerability. The Github® dataset is a real-world dataset with bug location and bug type information. The quantity of datasets in the first library ($162_0$) is for illustrative purposes and should not be considered limiting. Similarly, in an exemplary embodiment, the knowledge base (160) may include one or more additional libraries each having one more datasets therein. As such, the quantity of libraries shown and described herein should not be considered limiting.

As shown and described herein, the tools (152), (154), (156), and (158) subject a reduced form of an input sequence to the trained model for evaluation of signal awareness. The knowledge base (160) is shown herein with a second library ($162_1$) of trained models, shown herein as $model_{1,0}$ ($164_{1,0}$), $model_{1,1}$ ($164_{1,1}$), . . . , $model_{1,N}$ ($164_{1,N}$). The trained models are forms of neural network architectures, with different architectures operating on different representations of source code. The quantity of models in the second library ($162_1$) is for illustrative purposes and should not be considered limiting. Similarly, in an exemplary embodiment, the knowledge base (160) may include one or more additional libraries each having one or more models. Similarly, in an embodiment, the model subject to assessment may be communicated to the server from one of the operatively coupled computing devices across the network connection (105). Accordingly, the quantity of libraries shown and described herein should not be considered limiting.

The various computing devices (180), (182), (184), (186), (188), and (190) in communication with the network (105) demonstrate access points for the AI platform (150) and the corresponding tools, including the token manager (152), the validator (154), the evaluator (156), and the signal manager (158). Some of the computing devices may include devices for use by the AI platform (150), and in one embodiment the tools (152), (154), (156), and (158) to support evaluating and quantifying AI model performance. The network (105) may include local network connections and remote connections in various embodiments, such that the AI platform (150) and the embedded tools (152), (154), (156), and (158) may operate in environments of any size, including local and global, e.g. the Internet. Accordingly, the server (110) and the AI platform (150) serve as a front-end system, with the knowledge base (160) and one or more of the libraries and datasets serving as the back-end system.

Reducing the input sequence is directed at identifying a minimal snippet of input to the trained model to generate model prediction as output, and comparison of the model prediction with the prediction of the corresponding unreduced input sequence. The reduced input sequence is identified through a process that iteratively splits an input sequence, as shown and described in FIG. 3, systematically and efficiently identifying the 1-minimal. As described in detail below, the server (110) and the AI platform (150) leverage input from the knowledge base (160) in the form of a dataset from one of the libraries, e.g. library ($162_0$) and a corresponding dataset, e.g. $dataset_{0,1}$ ($164_{0,1}$). In an embodiment, the dataset may be transmitted across the network (105) from one or more of the operatively coupled machines or systems. The AI platform (150) utilizes the token manager (152) to systematically isolate one or more relevant tokens of an input sequence. A token is an instance of a sequence of characters in some particular document that are grouped together as a semantic unit for processing. In an embodiment, a token may be an individual word, phrase, or whole sentence. The reduced input sequence is subject to a multi-tier assessment to ensure that is satisfies the following properties: preservation of the model's vulnerability prediction, the reduced subprogram is valid and compilable, and vulnerability type assessment verifying the reduced subprogram either possess the same vulnerability location and type(s) as the original sample, or is free of the vulnerability. The vulnerability type assessment maintains fairness to the model by not querying it with a subprogram that has one or more additional vulnerabilities introduced by the minimization of the input sequence.

Isolating the tokens to create the reduced input sequence is not trivial, and the reduced sequence is subject to evaluation to ensure that the corresponding program maintains functionality. In an exemplary embodiment, the functionality maintenance is reflected in the ability to compile the input sequence. As shown, the validator (154), which is operatively coupled to the token manager (152), functions to validate the reduced input sequence, which in an embodiment ensures that the reduced input sequence can be compiled. The ability to compile the reduced sequence serves as verification by the validator (154) that the input sequence is a valid sequence, and in an exemplary embodiment takes place prior to presenting the reduced sequence to the trained model. Subject to the validation, the validator (154) presents the reduced input sequence to the trained model as model input, and the model generates output in the form of a prediction. Accordingly, the validator (154) conducts an assessment of the reduced input sequence, prior to signal awareness evaluation, to ensure that the reduced sequence is a valid program.

The evaluator (156) is shown herein operatively coupled to the validator (154). Prior to token removal, the input sequence is associated with corresponding ground truth. For example, if the input sequence is known to contain a vulnerability, then this is reflected in the ground truth. Similarly, if the input sequence is known to be free of any vulnerabilities, then this is similarly reflected in the ground truth. The evaluator (156) functions as a tool to compare the prediction output from the AI model of the reduced input sequence with output from the AI model of the original input sequence. In an exemplary embodiment, the comparison enables the evaluator (156) to ensure that the reduced input sequence preserves the AI model prediction. The token manager (152), validator (154), and evaluator (156) function as a set of tools to iteratively and systematically reduce the input sequence while ensuring that the reduced input sequence is a valid sequence and while preserving the prediction of the model. The conclusion of the systematic reduction is an identification of a minimal sub-sequence from the original input sequence, with the minimal sub-sequence preserving the AI model prediction.

The signal manager (158) is shown herein operatively coupled to the evaluator (156). The signal manager (158) functions to measure the signal awareness of the minimal sub-sequence, with the signal awareness directed at verifying if the trained model is learning correct logic relevant to code analysis, in an embodiment, irrespective of the learning techniques used in the trained model. In an exemplary embodiment, a signal awareness metric, referred to herein as signal awareness recall (SAR) is directed at evaluating signal awareness of the trained model. The functionality of the signal manager (158) is effectively a two-part analysis, with the first part directed at verification of signal existence in the minimal sub-sequence, and the second part directed at evaluation of signal awareness of the AI model. The evaluation employs the signal manager (158) to measure the verified signal of the minimal sub-sequence against a ground truth signal from the original input sequence, also referred to herein as signal existence verification. Details of the SAR and the corresponding metric assessment is shown and described in FIG. 6. The signal manager (158) classifies samples of a dataset's test set into true positive (TP) and false negative (FN), based on the model prediction(s). The signal manager (158) further identifies presence or absence of the vulnerability of the original input in the 1-minimal, for all TP samples, resulting in signal-aware and signal-unaware subsets with TP' representing presence and FN' representing absence. Accordingly, the classifications and corresponding assessment enables the signal manager (158) to quantify the SAR.

Although shown as being embodied in or integrated with the server (110), the AI platform (150) may be implemented in a separate computing system (e.g., 190) that is connected across the network (105) to the server (110). Similarly, although shown local to the server (110), the tools (152), (154), (156), and (158) may be collectively or individually distributed across the network (105). Wherever embodied, token manager (152), the validator (154), the evaluator (156), and the signal manager (158) are utilized to support and enable SAR measurement and evaluation.

Types of information handling systems that can utilize server (110) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188) and a server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190$_A$), and mainframe computer (182) utilizes nonvolatile data store (182$_A$). The nonvolatile data store (182$_A$) can be a component that is external to the various information handling systems or can be internal to one of the information handling systems.

Information handling systems may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
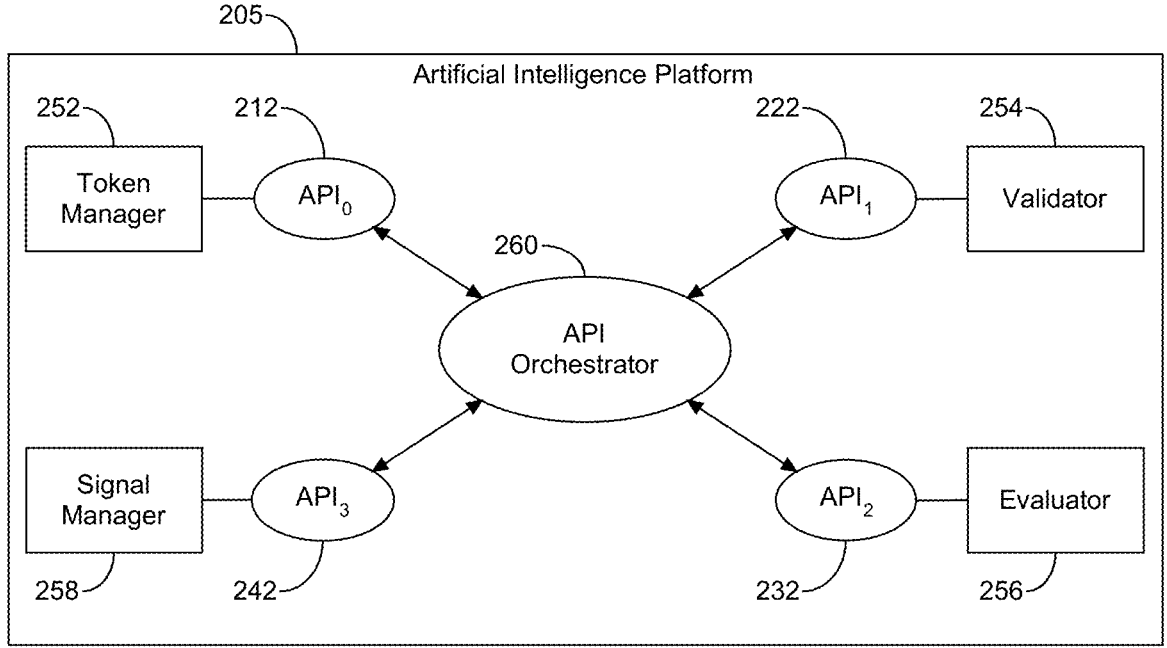
FIG. 2 depicts a block diagram a block diagram is provided illustrating the tools shown in FIG. 1 and their associated APIs.

An Application Program Interface (API) is understood in the art as a software intermediary between two or more applications. With respect to the embodiments shown and described in FIG. 1, one or more APIs may be utilized to support one or more of the AI platform tools, including the token manager (152), the validator (154), the evaluator (156), and the signal manager (158), and their associated functionality. Referring to FIG. 2, a block diagram (200) is provided illustrating the AI platform tools and their associated APIs. As shown, a plurality of tools are embedded within the AI platform (205), with the tools including the token manager (252) associated with API$_0$ (212), the validator (254) associated with API$_1$ (222), the evaluator (256) associated with API$_2$ (232), and the signal manager (258)

associated with API₃ (242). Each of the APIs may be implemented in one or more languages and interface specifications.

API₀ (212) provides support for systematically isolating one or more tokens of an input sequence. API₁ (222) provides support for validating the reduced input sequence. API₂ (232) provides support for ensuring that the reduced input sequence preserves the AI model prediction. API₃ (242) provides support for evaluating and measuring signal awareness. As shown, each of the APIs (212), (222), (232), and (242) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Referring to FIG. 3, a flow chart (300) is provided to illustrate a process for prediction-preserving source code minimization. As shown, input in the form of a trained neural model and a program sample, e.g. source code, which the trained model predicts to be vulnerable are received or otherwise identified (302). One or more tokens are systematically removed from the program sample (304), which in one embodiment takes place by removing one token at a time thereby creating a reduced sub-program. In an exemplary embodiment, a fault isolation technique of Delta Debugging is used to iteratively reduce the program sample at the level of source code tokens. An oracle function is known in the art as a subprogram that is used to return a single value. Input is a sequence satisfying a predefined oracle function, which drives the reduction cycle. In an embodiment, the oracle function decides whether or not an intermediate reduced subprogram should be selected for one or more subsequent reductions. In an exemplary embodiment, and as shown and described herein, in order to produce a valid and prediction preserving 1-minimal subprogram, the oracle function requires that the reduced subprogram satisfy the properties of a vulnerable prediction, a valid program, same vulnerability location and vulnerability type. The vulnerable program preservation ensures that the subprogram is selected for further processing only if it preserves the model's vulnerability prediction. The valid program ensures that the reduced subprogram is compilable, thereby reducing abuse of the model with random non-valid code as input. In addition, the valid program requirement enables cross-verification with conventional program analysis tools. The vulnerability type and location satisfaction requirement ensure that the subprogram is verified for either possessing the same program error location and types as the original source code sample, or that the subprogram is error-free, contingent on the oracle function quality. The vulnerable type satisfaction maintains fairness to the model by not querying it with subprograms which have any additional errors introduced by the minimization process itself.

The program sample with the removed token is subject to successful compiling to ensure the program sample is valid and capable of executing (306). It is then determined if the compilation was successful (308). A negative response to the determination is an indication that the 1-minimal has not been attained and is followed by inserting the removed token into the program sample and returning to step (304) to identify and remove a different token from the program sample. However, a positive response to the determination is followed by feeding the program sample to the trained model to ascertain if the model prediction is maintained (310). In an exemplary embodiment, the determination at step (310) is directed at matching the model prediction with ground truth. This process of iteratively removing tokens from the program sample continues until a 1-minimal is extracted from the program sample, such that removing even a single token will change the model prediction. As shown herein, a positive response to the determination at step (310) is followed by a return to step (304) to further reduce the source code to reach the 1-minimal, and a negative response is an indication that the 1-minimal has been reach and is followed by exiting the token removal process. Accordingly, the 1-minimal represents the bare minimum excerpt of the input sample, which the model needs to arrive at and maintains its original prediction.

Following an exit from the reduction process, the 1-minimal has been identified. A further assessment is conducted (312) to ensure that the 1-minimal either has the same original vulnerability or it is vulnerability-free without any new vulnerabilities being introduced by the minimization procedure. The assessment at step (312) identifies if the 1-minimal contains a vulnerability, and if it does contain a vulnerability, it is then determined if the identified vulnerability of the 1-minimal is the same vulnerability, e.g. ground truth, as the original sample (314). A positive response to the determination at step (314) is followed by an indication that the trained model is learning vulnerability specific signals (316). A negative response to the determination at steps (312) or (314) is followed by an indication that the corresponding vulnerability from the original sample is missing in the 1-minimal, and that the model is capturing noise or features not relevant to vulnerabilities (318). The token sequence in the 1-minimal at step (318) is identified as not preserving the model prediction. The 1-minimal assessment requires a dataset with ground truth vulnerability information, where the ground truth refers to accuracy of the dataset. Accordingly, the trained model is evaluated based on the 1-minimal and the model prediction is subject to comparison with ground truth.

The following pseudo-code, referred to herein as Algorithm 1, demonstrates the reduction technique algorithm to derive and identify the 1-minimal. As shown, the reduction technique is a fault isolation Delta Debugging (DD) technique although in an embodiment a different reduction technique may be utilized, and as such, the DD fault isolation technique should not be considered limiting.

```
Input:
  T: Oracle function. T(x) is TRUE if x has certain predefined property.
  S: Input sequence, where T(S) = TRUE
Output:
  S': Reduced outcome preserving 1-minimal sequence
  1.      function DD(T,S)
  2.          n ← 2, S' ← S
  3.          Divide S equally into Δ₁, . . . Δₙ and the complements Vₖ =
              S − Δₖ, where
              k = 1, . . . , n
  4.          Test each T(Δ₁), . . . , T(Δₙ) and T(V₁), . . . , T(Vₙ)
  5.          if all FALSE then
  6.              n ← 2 * n
  7.              if n > |S| then
  8.                  return S'
  9.              else
 10.                  go to line 3
 11.          else if T(Δᵢ) = TRUE then
 12.              S' ← Δᵢ
 13.              n ← 2, S ← Δᵢ
 14.              if |S'| = 1 then
 15.                  return S'
```

-continued

```
16.         else
17.             go to line 3
18.         else if T(V_j) = TRUE then
19.             S' ← V_j
20.             n ← n−1, S ← V_j
21.             go to line 3
```

As shown in the pseudo-code, an input sequence S and an oracle function T are given. The fault isolation technique iteratively splits the input sequence and produces 1-minimal S' through four main steps. The first step is referred to as Split and Test, where in each iteration, the fault isolation technique splits the sequence in consideration into n segments and n corresponding complements. See line 3, where a complement is defined as $\nabla_k = S - \Delta_k$. The fault isolation technique tests all partitions using the provided oracle function T, see line 4, and checks if some partitions lead to the same outcome. The second step is referred to herein as reduce a subset. At this step, if the test result of a subset $\Delta_i$ is the same as S, the fault isolation technique treats $\Delta_i$ as the sequence for the next iteration and results the granularity n. See lines 11-17. The third step is referred to herein as reduce a complement. At this step, if complement $\nabla_j$ is an outcome-preserving input, as shown at line 18, the fault isolation technique adjusts n and explores it with the same granularity, as shown at line 20. The fourth step is referred to herein as Operate on a finer granularity, where if none of the partitions can preserve the outline, as shown at line 5, then the fault isolation technique doubles the partition number n to split the sequence into small segments, as shown at line 6. In each iteration, the fault isolation technique tries to reduce the scope of a subset. In an exemplary embodiment, the fault isolation technique functions as a binary search to systematically and efficiently identify the 1-minimal. Accordingly, the fault isolation technique process of identifying a minimal sub-sequence of the input which leads to the same output translates to identifying the 1-minimal, e.g. minimal sub-program, which preserves the model's prediction.

The fault isolation technique process employs an oracle function which drives the reduction cycle. The oracle function decides whether or not an intermediate reduced subprogram should be selected for one or more subsequent reductions. The following pseudo-code demonstrates functionality to produce a valid and prediction-preserving 1-minimal subprogram:

```
Input:
    S: C/C++ program token sequence
    M: A vulnerability detection model
    v: Original program's vulnerability information
Output:
TRUE:       S represents a valid but vulnerably program per M.
            It should be further checked for
            reduction opportunities
1.          function T(S)
2.              p ← TOKEN2PROGRAM(S)
3.              if VALIDPROGRAM(p) and M(p) = VULNERABLE then
4.                  if SAMEVULN (p,v) or NOVULN(p) then
5.                      return TRUE
6.                  else
7.                      return FALSE
8.              else
9.                  return FALSE
```

In order to produce a valid and prediction-preserving 1-minimal subprogram, the oracle function, T, requires the reduced subprogram to satisfy the following properties:

vulnerable prediction, valid program, and vulnerability type. The vulnerable prediction ensures that the subprogram selected for further processing preserves the model's vulnerability prediction. The valid program requirement is directed at enforcing that the reduced subprogram is valid and compilable. The vulnerability type property is directed at verifying the reduced subprogram for either possessing the same vulnerability location and type as the original sample, or being vulnerability-free, contingent on the quality of the oracle function. As shown in line 4, the 1-minimal either has the same original vulnerability or is vulnerability-free, without any new vulnerabilities being introduced by the minimization procedure. As shown and described in FIG. 3, if the 1-minimal contains the same vulnerability as the original sample, then the 1-minimal is treated as a sign of the model learning vulnerability-specific signals. Alternatively, if the corresponding vulnerability from the original sample is missing in the 1-minimal, then it is understood that the model is capturing noise or features that are irrelevant to the vulnerabilities.

Referring to FIGS. 4A-4B, a diagram (400) is provided to illustrate an example of source code minimization to produce a valid 1-minimal and determine if the model learns vulnerability related signals. In the original program, a buffer overflow can be triggered in "buf[b]=1" when b>=10, as shown at test 01 (410). Two indicators are provided (412) and (414) to illustrate that the program is valid and the vulnerability prediction is maintained. In the second and third iterations, shown and (420) and (430) respectively, e.g. test 02 and test 03, the token sequence is split into two parts, neither of which are valid programs, as shown at (422) and (434), respectively. The fault isolation technique then operates on a finer granularity by splitting the token sequence into four parts, as shown at (440), (442), (444), and (446), e.g. n is increased to 4. Similar to tests 02 and 03, none of the subprograms in the token sequences are valid, as demonstrated at $(440_A)$, $(442_A)$, $(444_A)$, and $(446_A)$. Because of the invalid subprograms, the fault isolation technique further adjusts the granularity by splitting the token sequence into eight parts, e.g. n is increased to 8. With this adjustment (450), a valid subprogram is identified (452). Since the model predicts the token sequence at (450) to be vulnerable, statement 'a+3' can be removed from the subprogram. Iterations of the reduced token sequence are found at (460), (470) and (480), with each of these versions identified as valid sequences at (462), (472), and (482), respectively, and with vulnerable predictions at (464), (474), and (484), respectively. The valid program identifications and vulnerability predictions serves as indicators that more tokens can be considered for removal from the sequences. Given that there are no smaller valid subprograms, the token sequence iteration at (480) is identified as the prediction preserving 1-minimal. Accordingly, the token sequence at (480) is a valid sequence (482) and its prediction is vulnerable (484).

Referring to FIG. 5, a diagram (500) is provided to illustrate an example of source code minimization demonstrating a model incorrectly learning a non-vulnerability signal. The original source code is shown at (510). As shown, a sink variable 'data' points to a buffer of size 10 while the size of the source variable 'source' is 11. Therefore, a buffer overflow can occur. See line 11 (512). The original model prediction is shown as 'Buggy' (520), and the ground truth is shown as 'Buggy' (522). The original prediction is correct due to the buffer overflow. The reduced source code, referred to here as 1-minimal, is shown at (540). The 'bug' from at (512) is removed in from the original source code at line 11. The prediction of the 1-minimal by the model is shown at (550) as "Buggy", even though the 1-minimal it does not contain the actual bug (512). Accordingly, in this example of the 1-minimal it is suggested that the model incorrectly learns non-vulnerability signals.

Figure 6:
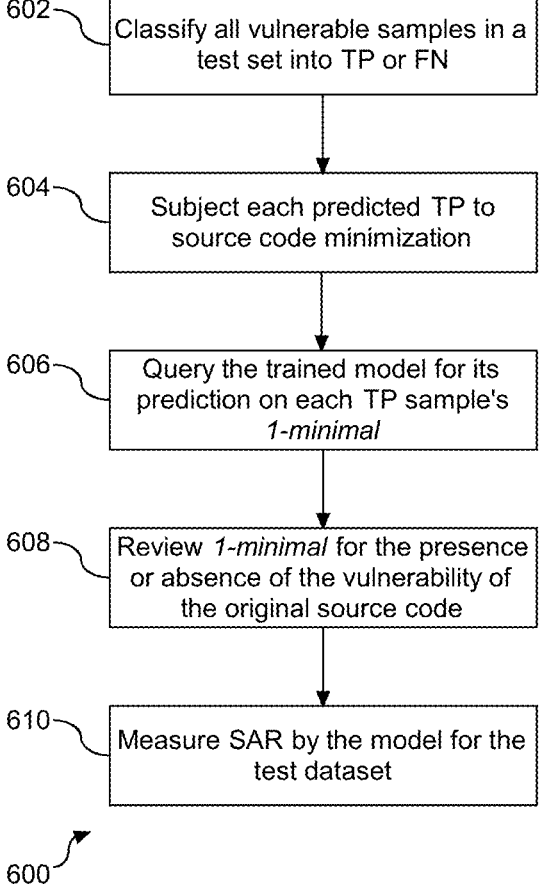
FIG. 6 depicts a flow chart to illustrate model evaluation for signal awareness recall (SAR).

The signal awareness of the trained model or models is subject to a measurement referred to herein as signal awareness recall (SAR), which is a quality measure of the corresponding model. In an exemplary embodiment, different models may be compared in terms of the signal awareness capacity. The signal awareness measurement requires datasets with ground truth vulnerability location. Referring to FIG. 6, a flow chart (600) is provided to illustrate model evaluation for SAR. A trained model classifies all vulnerable samples in a test set into True Positive (TP) or False Negative (FN) (602). Each predicted TP is subject to source code minimization, as shown in FIG. 3, (604), and the trained model is queried for its prediction on each TP sample's 1-minimal version (606). Thereafter, the 1-minimal is reviewed for the presence or absence of the vulnerability of the original source code (608). TP' represents the presence of the original vulnerability in the 1-minimal and FN' represents the absence of the original vulnerability in the 1-minimal. Accordingly, the TP is subdivided into signal-aware TP' and absence of the original vulnerability FN'.

Recall is a metric to compare different models on the same dataset. The number of vulnerable samples, represented as the combination of the set of TP and FN, e.g. TP+FN, is equal to the sum of TP'+FN'+FN, which will be the same for all models for the same dataset. The signal aware recall (SAR) metric introduced herein, measures the signal-awareness of vulnerability detection models. Recall is defined as:

$$\frac{TP}{(TP + FN)}$$

and SAR is defined as:

$$\frac{TP'}{(TP' + FN' + FN)}$$

where TP=TP'+FN'. Accordingly, utilizing these definitions, SAR is measured for the model for the test dataset (610).

The source code minimization to identify the 1-minimal, may be applied on different machine learning and neural network models for vulnerability detection, including a Convolutional Neural Network (CNN), a Recurrent Neural Network (RNN), and a Graph Neural Network (GNN). Each of these models or class of models operates on different representations of source code. The CNN model treats source code as an image and learns the pictorial relationship between source code tokens and underlying vulnerabilities. In an embodiment, token normalization is applied before feeding data into the model. Examples of token normalization include normalizing function names and variable names to fixed tokens, such as Func and Var. The RNN models treats source code as a linear sequence of tokens and uses a temporal relationship between its tokens to detect vulnerabilities. Similar to the CNN, an input function may be normalized during pre-processing. With respect to the GNN, this model operates as a graph-level representation of source code, and vulnerability signatures are learned in terms of relationships between nodes and edges in a graph. In an embodiment, token normalization is not applied during pre-processing. Regardless of AI model type, the signal awareness measurement does not require knowledge about the model's internals, and as such, the measurement is applicable to a variety of model types, including but not limited to, classic machine learning, CNN, RNN, GNN, etc. Accordingly, the SAR is a metric to measure how well a trained model captures task-specific signals, which enables a fair model evaluation and comparison standard.

Aspects of the tools (152), (154), (156), and (158) and their associated functionality may be embodied in a computer system/server in a single location, or in an embodiment, may be configured in a cloud based system sharing computing resources. With references to FIG. 7, a block diagram (700) is provided illustrating an example of a computer system/server (702), hereinafter referred to as a host (702) in communication with a cloud based support system, to implement the system and processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, micro-processor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments (710) where tasks are performed by remote processing devices that are linked through a communications network. In a distributed cloud computing environment, program modules may be located in both local and remote computer system storage media including memory storage devices.

Figure 7:
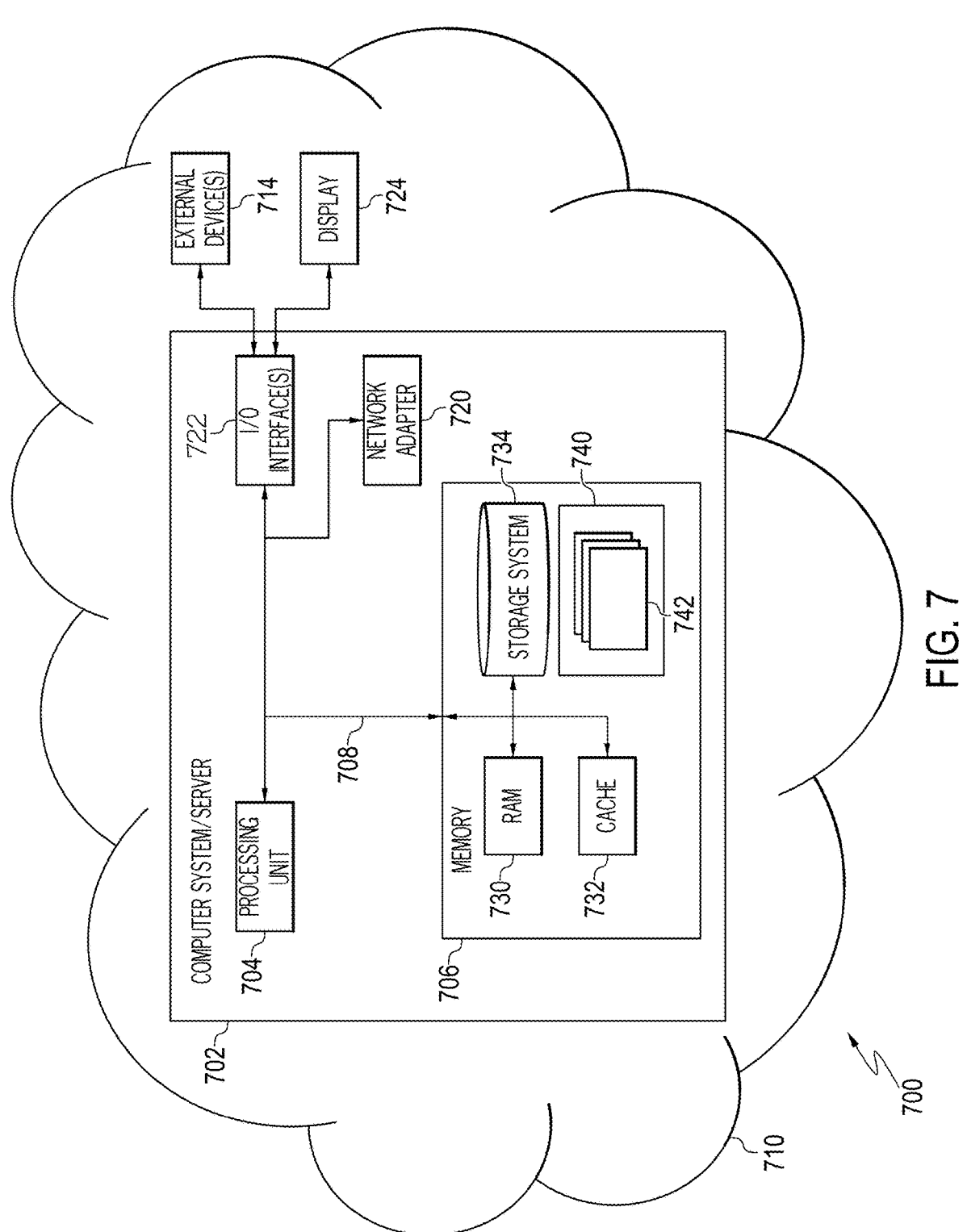
FIG. 7 is a block diagram depicting an example of a computer system/server of a cloud based support system, to implement the system and processes described above with respect to FIGS. 1-6.

As shown in FIG. 7, host (702) is shown in the form of a general-purpose computing device. The components of host (702) may include, but are not limited to, one or more processors or processing units (704), a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732).

By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments of the SAR assessment. For example, the set of program modules (742) may include the modules configured as the tools (152), (154), (156), and (158) described in FIG. 1.

Host (702) may also communicate with one or more external devices (714), such as a keyboard, a pointing device, a sensory input device, a sensory output device, etc.; a display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In one embodiment, a plurality of nodes of a distributed file system (not shown) is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
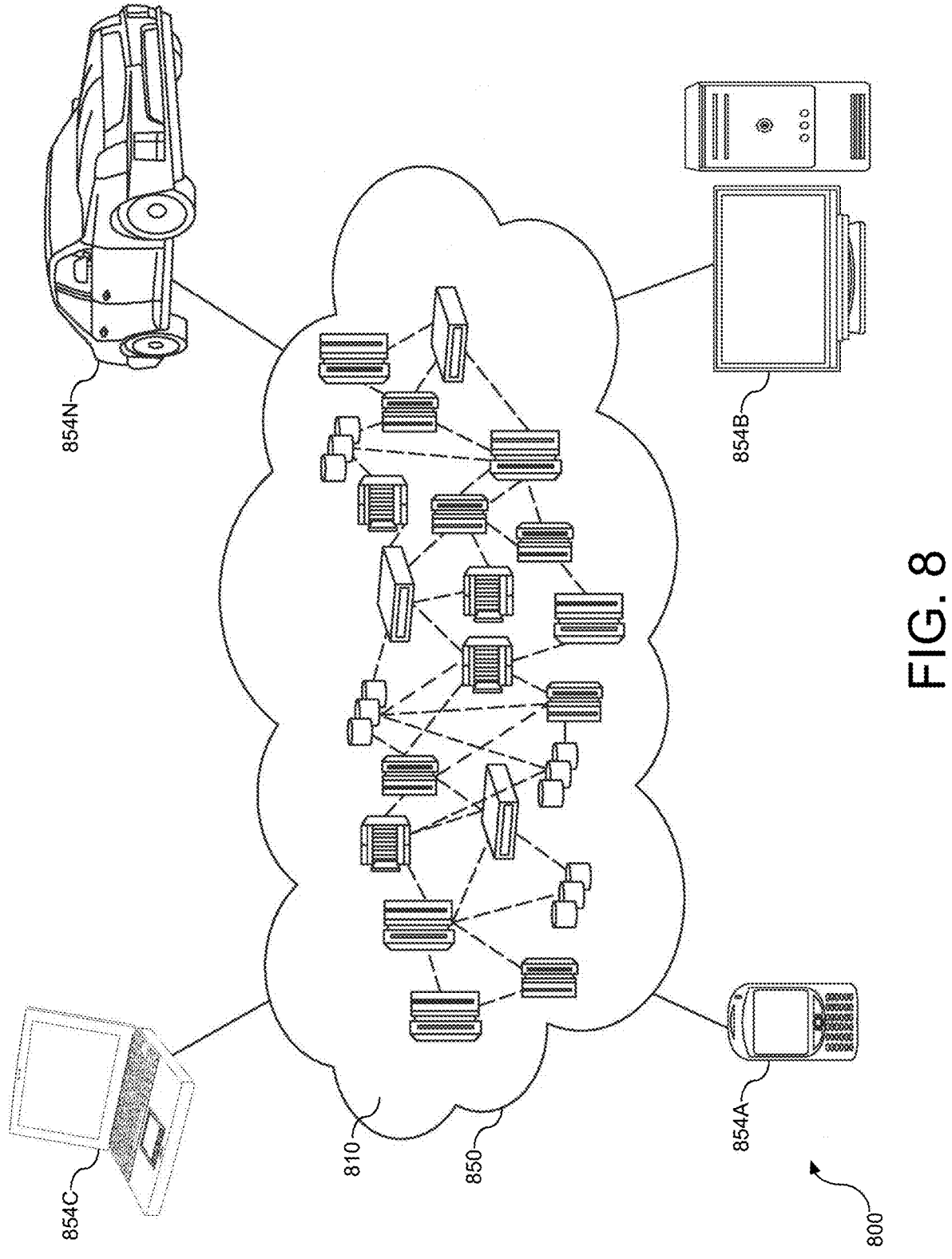
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
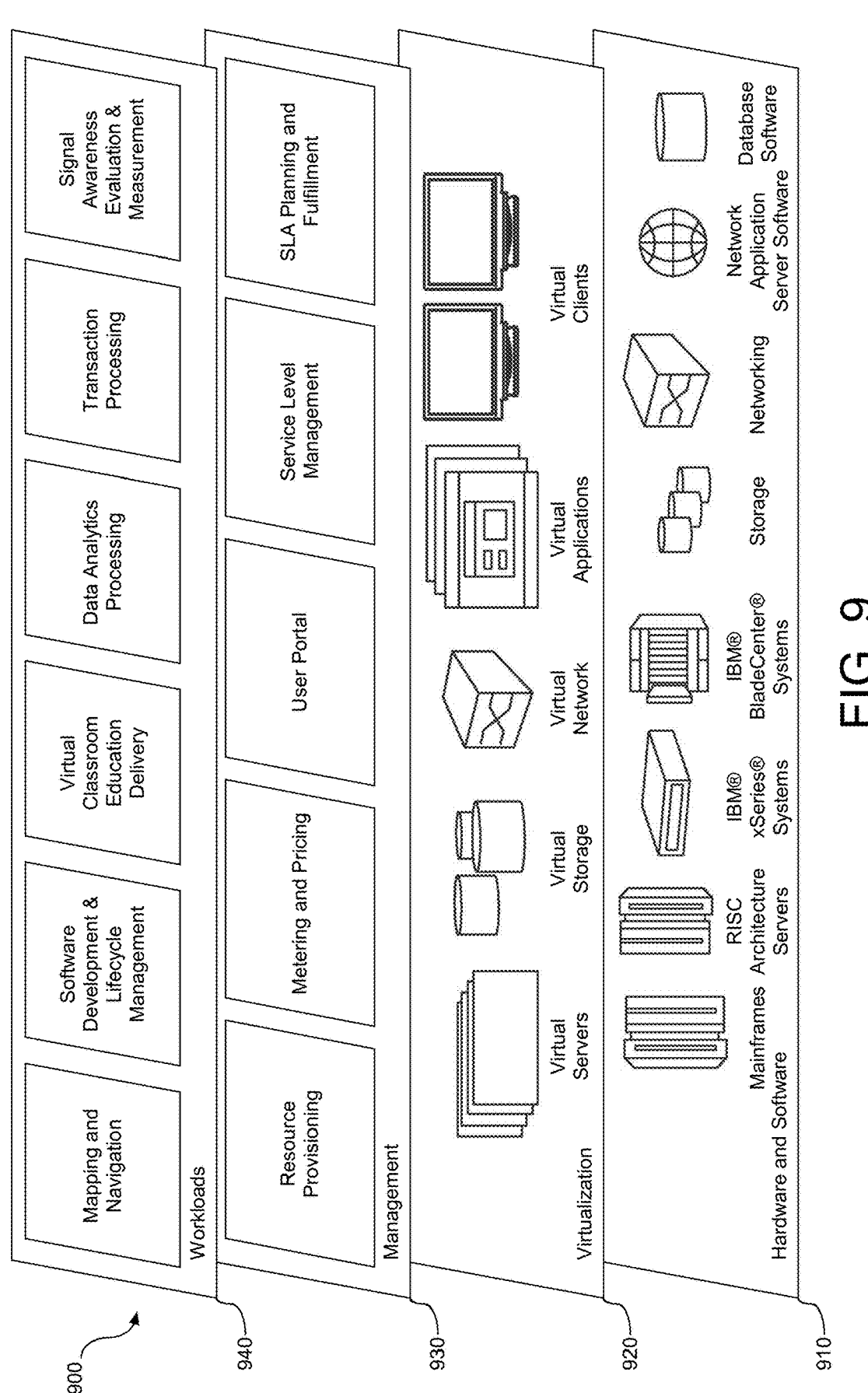
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940). The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and signal awareness evaluation and measurement.

The system and flow charts shown herein may also be in the form of a computer program device for signal awareness measurement of a trained AI model. The device has program code embodied therewith. The program code is executable by a processing unit to support the described functionality.

While particular embodiments have been shown and described, it will be obvious to those skilled in the art that, based upon the teachings herein, changes and modifications may be made without departing from its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of dynamical orchestration of a pre-requisite driven codified infrastructure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiment(s). In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the systematic removal of tokens from the input sequence may be carried out by different computing platforms or across multiple devices. Furthermore, the libraries may be localized, remote, or spread across multiple systems. Accordingly, the scope of protection of the embodiment(s) is limited only by the following claims and their equivalents.

What is claimed is:

1. A computer system comprising:
a memory for storing a computer program for probing model signal awareness; and
a processor connected to the memory, wherein the processor is configured to execute program instructions of the computer program comprising:
iteratively identifying a minimal sub-sequence from an input sequence while preserving a prediction from a trained AI model, wherein the trained AI model classifies samples in a test dataset into true positive or false negative, wherein a source code for each sample classified as a true positive is minimized to produce a 1-minimal, wherein the 1-minimal corresponds to a subset of the source code that leads to a same output of the sample, wherein the 1-minimal includes a reduction in lines of code of the source code by removing a vulnerability from the source code, wherein the trained AI model incorrectly learns non-vulnerability signals in response to predicting the 1-minimal containing the vulnerability even though the 1-minimal does not contain the vulnerability, wherein the trained AI model is queried for its prediction on each of the true positive sample's 1-minimal, wherein each of the true positive sample's 1-minimal is reviewed for presence or absence of the vulnerability in the source code, wherein the vulnerability in the source code arises when programming defects occur, including;
presenting a validated reduced input sequence to the AI model to generate a prediction;
comparing the generated prediction of the reduced sequence with a prediction output of the input sequence; and
verifying signal existence in the minimal sub-sequence resulting from one or more reduced input sequences, and responsive to the verification, leverage the signal existence of the minimal sub-sequence and create a signal awareness measurement of the trained AI model, wherein the measurement of the signal awareness represents an ability of the trained AI model to capture a signal.

2. The system of claim 1, wherein the program instructions of the computer program further comprise:
isolating one or more tokens of the input sequence to the trained AI model and generating the reduced input sequence, wherein the isolation of the one or more tokens of the input sequence includes reducing the input sequence to a smallest valid sub-sequence while preserving the prediction from the trained AI model, wherein a token is removed from the source code for a sample classified as the true positive thereby creating a reduced sub-program.

3. The system of claim 2, wherein the program instructions of the computer program further comprise:
compiling the reduced sub-program; and
inputting the source code for the sample to the trained AI model to ascertain if a prediction of the trained AI model is maintained in response to a success of the compilation.

4. The system of claim 1, wherein creating the signal awareness measurement includes measuring signal aware recall (SAR) of the trained AI model.

5. The system of claim 4, wherein SAR is defined as:

$$\frac{TP'}{(TP' + FN' + FN)}$$

wherein the samples in the test dataset are classified into true positive (TP) or false negative (FN), wherein TP' represents presence of a correct signal in the minimal valid sub-sequence and FN' represents absence of the correct signal in the minimal valid sub-sequence.

6. The system of claim 3, wherein the program instructions of the computer program further comprise:
identifying the 1-minimal in response to the prediction of the trained AI model not being maintained; and
removing a different token from the source code for the sample in response to the prediction of the trained AI model being maintained.

7. A computer program product comprising:
a computer readable storage medium; and
program code embodied with the computer readable storage medium, the program code executable by a processor to:
iteratively identifying a minimal sub-sequence from an input sequence while preserving a prediction from a trained AI model, wherein the trained AI model classifies samples in a test dataset into true positive or false negative, wherein a source code for each sample classified as a true positive is minimized to produce a 1-minimal, wherein the 1-minimal corresponds to a subset of the source code that leads to a same output of the sample, wherein the 1-minimal includes a reduction in lines of code of the source code by removing a vulnerability from the source code, wherein the trained AI model incorrectly learns non-vulnerability signals in response to predicting the 1-minimal containing the vulnerability even though the 1-minimal does not contain the vulnerability, wherein the trained AI model is queried for its prediction on each of the true positive sample's 1-minimal, wherein each of the true positive sample's 1-minimal is reviewed for presence or absence of the vulnerability in the source code, wherein the vulnerability in the source code arises when programming defects occur, including;
present a validated reduced input sequence to the AI model to generate a prediction; and
compare the generated prediction of the reduced sequence with a prediction output from the input sequence;
verify signal existence in the minimal sub-sequence resulting from one or more reduced input sequences; and
leverage the verified signal of the minimal sub-sequence and create a signal awareness measurement of the trained AI model, wherein the measurement of the signal awareness represents an ability of the trained AI model to capture a signal.

8. The computer program product of claim 7, further comprising program code to isolate one or more tokens of the input sequence to the trained AI model and generate the reduced input sequence, wherein the isolation of the one or more tokens of the input sequence includes program code to reduce the input sequence to a smallest valid sub-sequence while preserving the prediction from the trained AI model, wherein a token is removed from the source code for a sample classified as the true positive thereby creating a reduced sub-program.

9. The computer program product of claim 8, further comprising program code to:
compile the reduced sub-program;
insert the removed token into the source code for the sample in response to a failure of the compilation; and
remove a different token from the source code for the sample.

10. The computer program product of claim 8 further comprising program code to:
compile the reduced sub-program; and
input the source code for the sample to the trained AI model to ascertain if a prediction of the trained AI model is maintained in response to a success of the compilation.

11. The computer program product of claim 7, wherein creation of the signal awareness measurement from the minimal sub-sequence further comprises program code to measure signal awareness recall (SAR) of the trained AI model.

12. The computer program product of claim 11, wherein SAR is defined as:

$$\frac{TP'}{(TP' + FN' + FN)}$$

wherein the samples in the test dataset are classified into true positive (TP) or false negative (FN), wherein TP' represents presence of a correct signal in the minimal valid sub-sequence and FN' represents absence of the correct signal in the minimal valid sub-sequence.

13. The computer program product of claim 10, further comprising program code to:
identify the 1-minimal in response to the prediction of the trained AI model not being maintained; and
remove a different token from the source code for the sample in response to the prediction of the trained AI model being maintained.

14. A computer-implemented method for probing model signal awareness, comprising:
iteratively identifying a minimal sub-sequence from an input sequence while preserving a prediction from a trained AI model, wherein the trained AI model classifies samples in a test dataset into true positive or false negative, wherein a source code for each sample classified as a true positive is minimized to produce a 1-minimal, wherein the 1-minimal corresponds to a subset of the source code that leads to a same output of the sample, wherein the 1-minimal includes a reduction in lines of code of the source code by removing a vulnerability from the source code, wherein the trained AI model incorrectly learns non-vulnerability signals in response to predicting the 1-minimal containing the vulnerability even though the 1-minimal does not contain the vulnerability, wherein the trained AI model is queried for its prediction on each of the true positive sample's 1-minimal, wherein each of the true positive sample's 1-minimal is reviewed for presence or absence of the vulnerability in the source code, wherein the vulnerability in the source code arises when programming defects occur, including;
presenting a validated reduced input sequence to the AI model and generating a prediction; and
comparing the generated prediction of the reduced sequence with a prediction output of the input sequence; and
verifying signal existence in the minimal subsequence resulting from one or more reduced input sequences, and responsive to the verification, leveraging the verified signal existence of the minimal sub-sequence and creating a signal awareness measurement of the trained AI model, wherein the measurement of the signal awareness represents an ability of the trained AI model to capture a signal.

15. The method of claim 14, further comprising isolating one or more tokens of the input sequence to the trained AI model and generating the reduced input sequence, including reducing the input sequence to a minimal valid sub-sequence while preserving the prediction of the input sequence from the trained AI model, wherein a token is removed from the source code for a sample classified as the true positive thereby creating a reduced sub-program.

16. The method of claim 15, further comprising:
compiling the reduced sub-program;
inserting the removed token into the source code for the sample in response to a failure of the compilation; and
removing a different token from the source code for the sample.

17. The method of claim 15 further comprising:
compiling the reduced sub-program; and
inputting the source code for the sample to the trained AI model to ascertain if a prediction of the trained AI model is maintained in response to a success of the compilation.

18. The method of claim 14, wherein creating the signal awareness measurement includes measuring signal aware recall (SAR) of the trained AI model.

19. The method of claim 18, wherein SAR is defined as:

$$\frac{TP'}{(TP' + FN' + FN)}$$

wherein the samples in the test dataset are classified into true positive (TP) and false negative (FN), wherein TP' represents presence of a correct signal in the minimal valid sub-sequence and FN' represents absence of the correct signal in the minimal valid sub-sequence.

20. The method of claim 17 further comprising:
identifying the 1-minimal in response to the prediction of the trained AI model not being maintained; and
removing a different token from the source code for the sample in response to the prediction of the trained AI model being maintained.

* * * * *